(12) United States Patent
Huang

(10) Patent No.: US 11,683,061 B2
(45) Date of Patent: *Jun. 20, 2023

(54) UNIQUE WORD AND BURST HEADER DETECTION FOR AN EXPANDED FREQUENCY RANGE

(71) Applicant: Hughes Network Systems, LLC, Germantown, MD (US)

(72) Inventor: Qiujun Huang, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,379

(22) Filed: Jun. 15, 2022

(65) Prior Publication Data

US 2022/0311466 A1    Sep. 29, 2022

Related U.S. Application Data

(63) Continuation of application No. 16/914,071, filed on Jun. 26, 2020, now Pat. No. 11,387,858.

(51) Int. Cl.
| | | |
|---|---|---|
| *H04B 1/10* | (2006.01) | |
| *H04B 1/16* | (2006.01) | |
| *H04B 1/08* | (2006.01) | |
| *H04B 7/185* | (2006.01) | |

(52) U.S. Cl.
CPC .......... *H04B 1/1638* (2013.01); *H04B 1/082* (2013.01); *H04B 7/18513* (2013.01)

(58) Field of Classification Search
CPC ... H04B 1/1638; H04B 1/082; H04B 7/18513

USPC ......................................................... 375/343
See application file for complete search history.

(56) References Cited

U.S. PATENT DOCUMENTS

| | | | | |
|---|---|---|---|---|
| 11,387,858 B2 * | 7/2022 | Huang | ............... | H04B 7/18513 |
| 2017/0111912 A1 | 4/2017 | Keshet | | |

FOREIGN PATENT DOCUMENTS

| | | | |
|---|---|---|---|
| EP | 1 128 621 A2 | 8/2001 | |
| EP | 1 467 221 A2 | 10/2004 | |

OTHER PUBLICATIONS

International Search Report and Written Opinion for PCT/US2021/039157 dated Oct. 18, 2021, all pages.

\* cited by examiner

*Primary Examiner* — Tanmay K Shah
(74) *Attorney, Agent, or Firm* — Kilpatrick Townsend & Stockton, LLP

(57) ABSTRACT

Various data transmission detection systems are described. A receiver input through which a wireless data transmission signal is received may be present. A plurality of mixers in communication with the receiver input may be present, which may be digitally implemented. A data transmission detector may be present that receives a mixed wireless data transmission signal from each mixer and creates a plurality of scores. A match detection module may be present that receives the scores and identifies a highest score. The signal mapped to the highest score to be selected for further processing.

20 Claims, 5 Drawing Sheets

UNIQUE WORD AND BURST HEADER DETECTION FOR AN EXPANDED FREQUENCY RANGE

CROSS-REFERENCES TO RELATED APPLICATIONS

This application is a continuation of U.S. patent application Ser. No. 16/914,071, filed on Jun. 26, 2020, entitled "Unique Word and Burst Header Detection for an Expanded Frequency Range," the disclosure of which is hereby incorporated by reference in its entirety for all purposes.

BACKGROUND

Doppler shift affects the frequency at which a transmission sent by a transmitter device is received by a moving receiver device. As the relative speed of the receiver device toward or away from the transmitter device increases, so does the effect of the Doppler shift. If the effect of the Doppler shift is great enough, the receiver device may not be able to successfully receive data. For instance, if the receiver device is located on an airplane, automobile, or ship, the velocity of the vehicle may be sufficient to degrade the receiver device's ability to successfully receive a data transmission due to the data transmission being frequency-shifted.

SUMMARY

Various embodiments are described related to a data transmission detection system. In some embodiments, a data transmission detection system is described. The system may comprise a receiver input through which a wireless data transmission signal may be received. The system may comprise a plurality of mixers in communication with the receiver input. Each mixer of the plurality of mixers may mix a different frequency of a plurality of frequencies with the wireless data transmission signal. Each mixer of the plurality of mixers may output a mixed wireless data transmission signal, thereby creating a plurality of mixed wireless data transmission signals. The system may comprise a data transmission detector module that may receive the mixed wireless data transmission signal from each mixer of the plurality of mixers and may create a plurality of scores. Each score of the plurality of scores may correspond to a mixed wireless data transmission signal of the plurality of mixed wireless data transmission signals. The system may comprise a match detection module configured to receive the plurality of scores from the data transmission detector module. The match detection module may identify a highest score of the plurality of scores and may determine whether the highest score exceeds a match threshold. The match detection module may cause the mixed wireless data transmission signal mapped to the highest score to be selected.

Embodiments of such a system may include one or more of the following features: the wireless data transmission signal may comprise a unique word that may be used as a reference location with the wireless data transmission signal. Each score of the plurality of scores may be based on an amount of correlation between the unique word in the mixed wireless data transmission signal and a stored unique word. The receiver input may be attached to a moving object. The wireless data transmission signal received via the receiver input may be Doppler shifted due to movement of the moving object relative to a transmitter. The system may further comprise the transmitter. The transmitter may be a satellite. The plurality of mixers, the data transmission detector module, and the match detection module may function in a digital domain. The plurality of frequencies may be distributed around a known transmission frequency of a transmitter that transmitted the wireless data transmission signal. The plurality of mixers, the data transmission detector module, and the match detection module may be part of a first stage of the data transmission detection system. The system may further comprise a second stage of the data transmission detection system comprising a second plurality of mixers that each receive the wireless data transmission signal. Each mixer of the second plurality of mixers may mix a different localized frequency of a plurality of localized frequencies with the wireless data transmission signal. Each mixer of the plurality of mixers may output a mixed localized wireless data transmission signal, thereby creating a plurality of mixed localized wireless data transmission signals. The plurality of localized frequencies may be selected based on the mixing frequency of the selected mixed wireless data transmission signal mapped to the highest score. A localized frequency delta between each localized frequency of the plurality of localized frequencies may be smaller than a frequency delta between each frequency of the plurality of frequencies. The second stage of the data transmission detection system may further comprise a second data transmission detector module that may receive the mixed localized wireless data transmission signal from each mixer of the second plurality of mixers. The second data transmission detector module may create a second plurality of scores. Each score of the second plurality of scores may correspond to a mixed localized wireless data transmission signal of the plurality of mixed wireless data transmission signals. The second stage of the data transmission detection system may further comprise a second match detection module configured to receive the second plurality of scores from the second data transmission detector module. The second match detection module may identify a highest score of the second plurality of scores. A second match detection module may be configured to cause the mixed localized wireless data transmission signal mapped to the highest score of the second plurality of scores to be output for further processing. The data transmission detector module may create the plurality of scores based on detection of a unique word within the plurality of mixed wireless data transmission signals. The second data transmission detector module may create the second plurality of scores based on detection of a burst header within the plurality of mixed localized wireless data transmission signals.

In some embodiments, a method for performing data transmission detection is described. The method may comprise receiving a wireless data signal that may be Doppler-shifted. The method may comprise converting, using an analog to digital converter, the wireless data signal to a digital signal. The method may comprise mixing the digital signal with digital representations of a plurality of different frequencies to create a plurality of mixed digital signals. The method may comprise scoring each of the plurality of mixed digital signals for a presence of a unique word, thereby creating a plurality of scores. The method may comprise selecting a mixed digital signal of the plurality of mixed digital signals that may have a highest score of the plurality of scores for the presence of the unique word. The method may comprise outputting the selected mixed digital signal.

Embodiments of such a method may include one or more of the following features: the wireless data signal may comprise a unique word that may be used as a reference location with the wireless data signal. Each score of the plurality of scores may be based on an amount of correlation between the unique word in the mixed digital signals and a stored unique word. The method may be performed by a system that may be attached to a moving object. The wireless data signal may be Doppler-shifted due to movement of the moving object relative to a transmitter. The transmitter may be a satellite.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In order for a wireless data transmission to be successfully received by a receiver device, the receiver device needs to properly interpret the received wireless data transmission. Since the data transmission can be a stream of bits, even with a predefined data packet format, the receiver device needs a reference point within the stream of data to understand which bits correspond to which data fields within the stream. This reference point can be referred to as a unique word (UW). A properly-detected UW within a received data transmission can be used as a reference point for interpreting other data bits within the data transmission.

Properly identifying the UW can be affected by Doppler shift. As the relative speed of a receiver device toward or away from a transmitter device increases, so does the effect of the Doppler shift. The effect of the Doppler shift can be significant enough that a UW may not be able to be successfully located by the received device. This situation can lead to intermittent packet loss or, possibly, the inability to receive any data from the transmitter. Embodiments detailed herein allow for a receiver device to increase its ability to successfully receive data transmissions affected by Doppler shift.

Embodiments detailed herein include both one-stage and two-stage designs of a data transmission detection system. In a one-stage embodiment, a received wireless data transmission signal, which may be affected by Doppler shift, may be mixed with multiple mixing frequencies. These multiple mixing frequencies may be distributed at various deltas above and below the transmission frequency. The mixed wireless data transmission signal may then be analyzed for detection of a particular data string, such as a unique word. The mixed wireless data transmission signal that receives the highest score for best UW match and that exceeds a minimum threshold may be output for further processing.

A two-stage embodiment can involve additional processing being performed following the one-stage embodiment. Based on the mixed wireless data transmission signal selected, additional mixers may be configured that mix multiple localized mixing frequencies with the received wireless data transmission signal. The multiple localized mixing frequencies may be more tightly spaced than the previously-used multiple mixing frequencies and may be selected based on the mixing frequency of the mixed wireless data transmission signal that received the highest score. The mixed localized wireless data transmission signal may then be analyzed for detection of a particular data string, such as a burst header. The mixed wireless data transmission signal that receives the highest score for burst header detection may be output for further processing, such as reading the burst payload.

Figure 1:
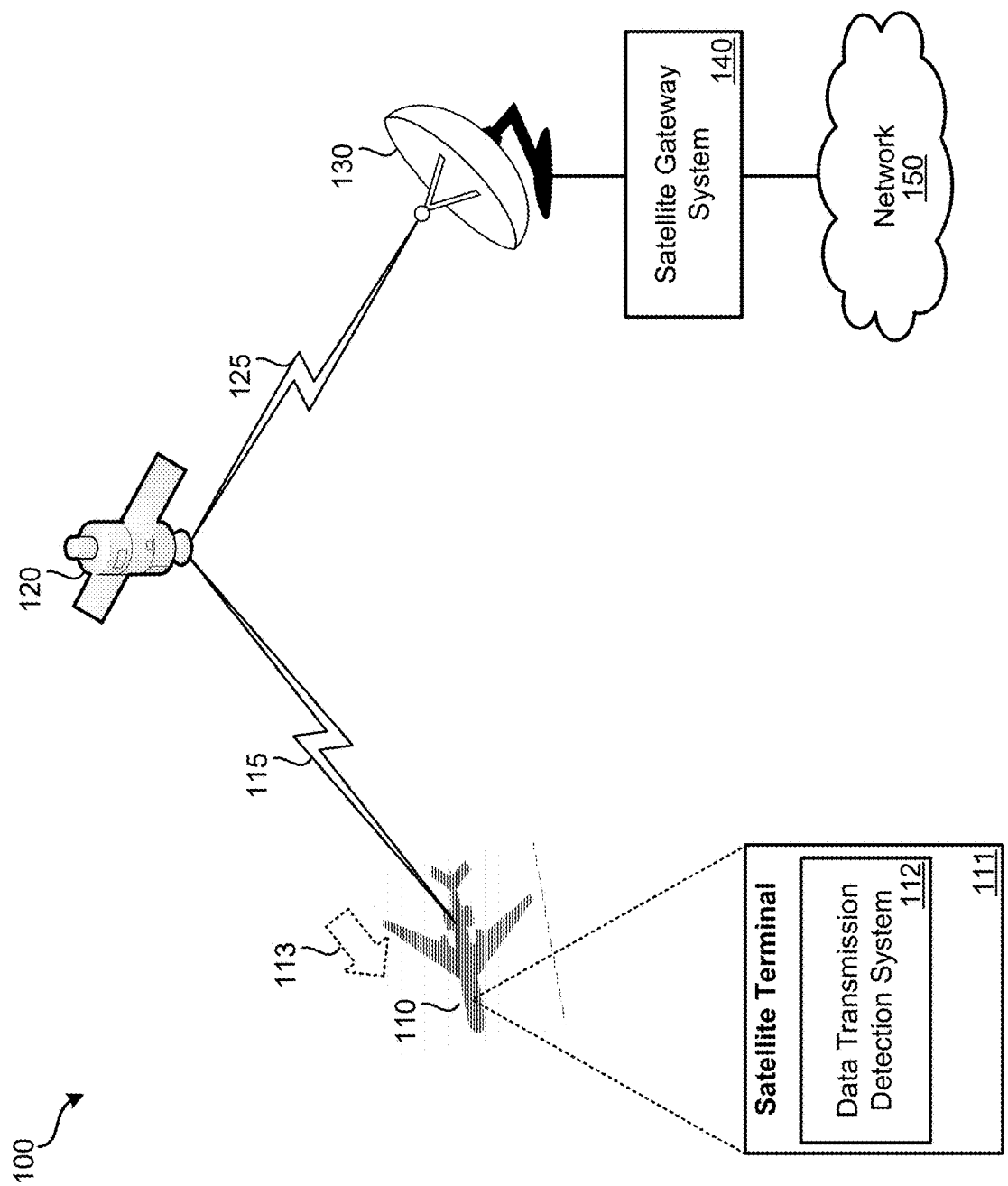
FIG. 1 illustrates an embodiment of a data transmission system.

Further detail regarding these and other embodiments is provided in relation to figures. FIG. 1 illustrates an embodiment of data transmission system 100 ("system 100"). System 100 can include: airplane 110; data transmission detection system 112; satellite 120; satellite antenna 130; satellite gateway system 140; and network 150. Network 150 may represent one or more public and/or private networks, such as the Internet and/or a private corporate network. Satellite gateway system 140, which can include one or more server systems, can serve as a bridge between satellite-based communications and terrestrial networks, such as network 150. Satellite antenna 130 may transmit and receive data from satellite 120 via link 125.

Satellite 120 may be in low earth orbit (LEO), middle earth orbit (MEO) or geosynchronous orbit (GEO). When in GEO, satellite 120 may remain relatively stationary over a location of the earth. Satellite 120 may serve to relay wireless transmission between satellite antenna 130 and various satellite terminals, such as satellite terminal 111. Satellite terminal 111 may serve as an access point that allows other devices, such as laptop computers, smartphones, desktop computers, gaming devices, streaming media players, etc., to access network 150. Satellite terminal 111 may send data via satellite 120 to satellite gateway system 140 and receive data via satellite 120 from satellite gateway system 140, using wireless link 115.

Satellite terminal 111 may be installed on a vehicle, such as an airplane, boat, automobile, truck, UAV, etc. that moves, possibly at a high rate of speed. In the illustrated example of system 100, satellite terminal 111 is present on airplane 110. On data transmission received by satellite terminal 111, Doppler shift may occur due to airplane 110 moving relative to satellite 120. In the illustrated example, airplane 110 is moving away with some velocity from satellite 120, thus causing some amount of Doppler shift to wireless transmissions (both uplink and downlink) of wireless link 115. Notably, the airplane's speed is not the velocity that airplane 110 is moving away from the satellite. Rather, the Doppler shift is caused by the relative velocity of airplane 110 away (or, in other embodiments, toward) satellite 120, as indicated in FIG. 1 by velocity vector 113.

In order to decrease the effect of Doppler shift, data transmission detection system 112 may be incorporated as part of, or in communication with, satellite terminal 111. In some embodiments, it may also be possible to incorporate data transmission detection system 112 as part of other systems, such as satellite 120 or satellite gateway system 140 to compensate for Doppler shift (such as for data transmitted by satellite terminal 111 or if satellite 120 is moving relative to satellite antenna 130). Further detail regarding possible embodiments and functionality of data transmission detection system 112 is provided in relation to FIGS. 2-5.

Figure 2:
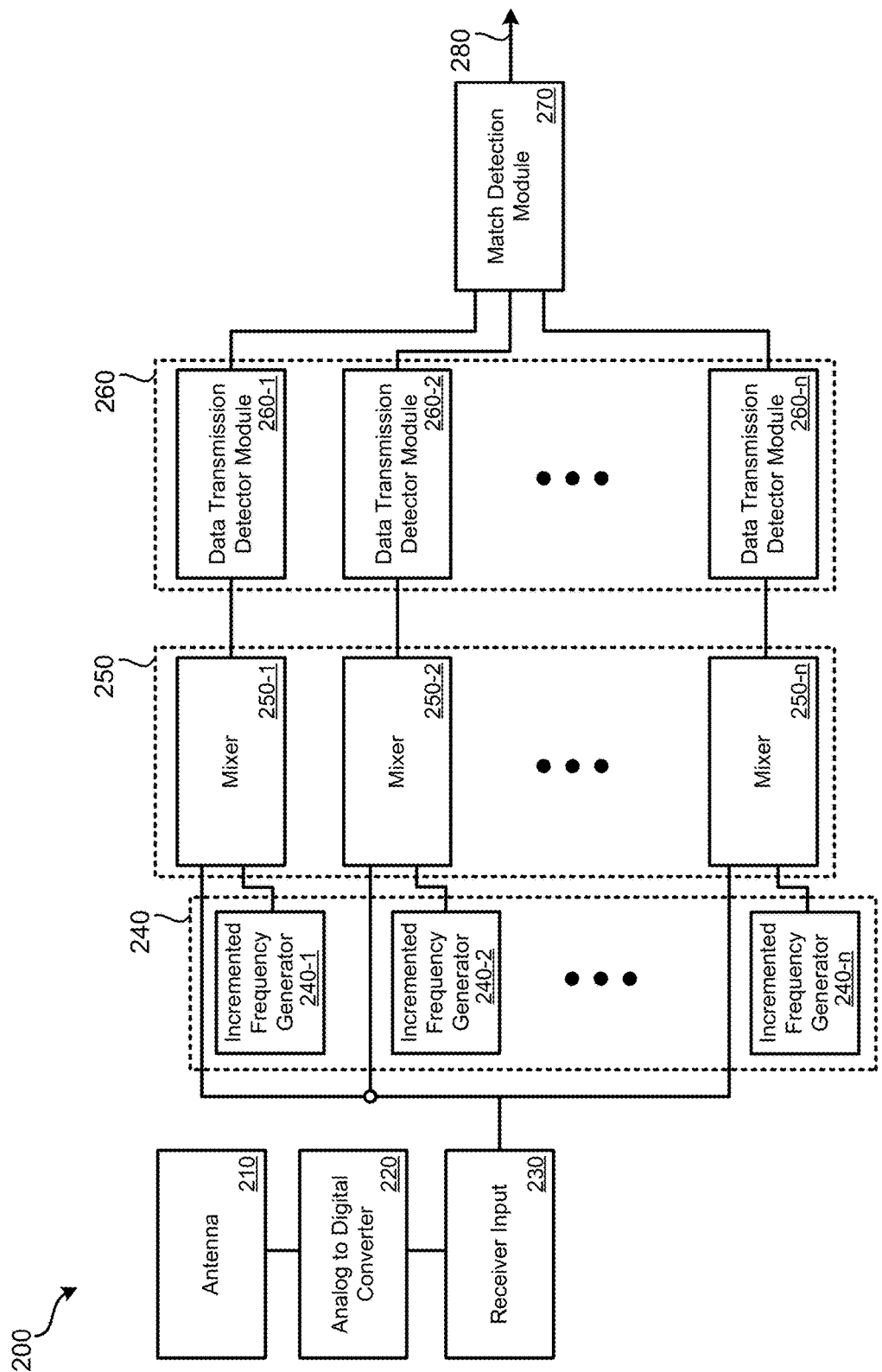
FIG. 2 illustrates an embodiment of a single-stage unique word detection system.

FIG. 2 illustrates an embodiment of a single-stage unique word detection system 200 ("system 200"). System 200 can represent an embodiment of data transmission detection system 112 of FIG. 1. System 200 can include: antenna 210; analog to digital converter (ADC) 220; receiver input 230; incremented frequency generators 240; mixers 250; data transmission detector modules 260; and match detection module 270. Antenna 210 may serve to receive communications from a satellite, such as satellite 120, or a terrestrial wireless access point, such as a cellular base station. ADC 220 may serve to convert the analog signals of a received wireless data signal received via antenna 210 to digital data. The remainder of system 200 may perform processing on the received wireless data transmission signal in the digital domain. In other embodiments, conversion of the digital domain may not occur and processing may be performed in the analog domain. In some embodiments, the functions of receiver input 230, incremented frequency generators 240, data transmission detector modules 260, and match detection module 270 may be implemented using a single piece of hardware that processes data in the digital domain, such as an FPGA (field programmable gate array). Alternatively, discrete digital components may be used to implement receiver input 230, incremented frequency generators 240, data transmission detector modules 260, and match detection module 270.

Receiver input 230 may serve to receive digital data from a source, such as ADC 220 and distribute the digital data to various mixers. Receiver input 230 may be an input of an FPGA that receives a signal from an off-chip source. In embodiments of system 200, multiple mixers 250 are present. In the illustrated embodiments, mixer 250-1, mixer 250-2, and mixer 250-n are present. In other embodiments, two or more than three mixers may be present. Mixers 250 may be implemented digitally, such as by using an FPGA. Each mixer may receive the received wireless data transmission signal as an input and an oscillating signal at a frequency from a corresponding incremented frequency generator of incremented frequency generators 240.

Incremented frequency generators 240 may each output an oscillating signal at a different frequency. Incremented frequency generators 240 may each be numerically controlled oscillators (NCOs). An NCO creates a digital representation of a sinusoidal clocked waveform. The frequencies may be set to have a fixed or variable frequency delta from each other and may be based on the frequency that was used to transmit the received wireless data transmission signal by the transmitter. Therefore, for example, in a five mixer (and five incremented frequency generator) embodiment, if the transmitter transmitted the wireless data transmission signal at frequency F, a first incremented frequency generator may output an oscillating signal of frequency F−2Δf, a second incremented frequency generator may output an oscillating signal of frequency F−Δf, a third incremented frequency generator may output an oscillating signal of frequency F, a fourth incremented frequency generator may output an oscillating signal of frequency F+Δf, and a fifth incremented frequency generator may output an oscillating signal of frequency F+2Δf. In such an embodiment, Δf may be between 50 Hz and 700 Hz. Δf may be selected based on the maximum velocity that system 200 can be expected to move away or toward the transmitter. In some embodiments, a variable Δf may be used. In some embodiments, the output frequencies of incremented frequency generators 240 may be within a range above and below the frequency at which the transmitter transmitted the wireless data transmission signal, at frequencies above which the transmitter transmitted the wireless data transmission signal, or frequencies below which the transmitter transmitted the wireless data transmission signal.

The output of each mixer may be the result of mixing the wireless data transmission signal with the oscillating output of the corresponding frequency generator of incremented frequency generators 240. For example, if incremented frequency generator 240-1 outputs an oscillating signal of frequency F−2$\Delta$f, the output of mixer 250-1 is the result of mixing the wireless data transmission signal with the oscillating signal F−2$\Delta$f.

A data transmission detector module of data transmission detector modules 260 is present and in communication with each mixer output. Therefore, a same number of data transmission detector modules 260 are present as mixers 250. Data transmission detector modules 260 may each analyze the mixed output from a corresponding mixer to determine how well the mixed wireless data transmission signal matches expected data. Within the wireless data transmission signal may be a sequence of data that is intended to serve as a reference point within a packet stream. This sequence of data can be referred to as a unique word (UW). Therefore, each data transmission detector module has access to stored data that indicates how to identify the UW. Each data transmission detector module compares a stored UW (or otherwise uses data to identify the UW) with its received mixed wireless data transmission signal to determine a score. Each score may be output to match detection module 270. A higher score represents a higher correlation between an expected UW and the detected UW.

The data transmission detector module of data transmission detector modules 260 expected to output the highest score will be the data transmission detector module that receives the mixed wireless data transmission signal from the mixer that best compensates for Doppler shift based on the frequency mixed with the wireless data transmission signal from the corresponding incremented frequency generator.

The scores based on detection of UW match by data transmission detector modules 260 may be output to match detection module 270. Match detection module 270 may perform two functions: 1) select a mixed wireless data transmission signal based on it corresponding to a greatest score; and 2) determine if the greatest score exceeds a predefined minimum score threshold. These two steps can be performed in either order: in some embodiments, the predefined minimum score threshold is used to discard scores prior to selecting the highest score; in other embodiments, the maximum score is determined first; then the selected highest score is compared to the predefined minimum score threshold.

In some embodiments of system 200, a single-stage implementation is present. In a single-stage implementation, the mixed wireless data transmission signal selected based on the score by match detection module 270 may be output for further processing. This further processing can include obtaining other data fields (besides the UW) from the mixed wireless data transmission signal, such as a burst header (BH) and burst payload. In other embodiments, a two-stage (or more than two-stage) implementation may be present. In a two-stage implementation, further refinement to compensate for the Doppler effect is performed, such as in accordance with the additional components of the burst header detection system of FIG. 3. A single-stage embodiment may produce a "coarse" frequency estimate that counteracts the Doppler effect on a received wireless signal; and a two-stage embodiment may additionally produce a "fine" frequency estimate that can more accurately counteract the Doppler shift on the received wireless signal. In yet other embodiments, more stages may be added to further refine the frequency estimate to counteract the Doppler shift of the received signal.

Figure 3:
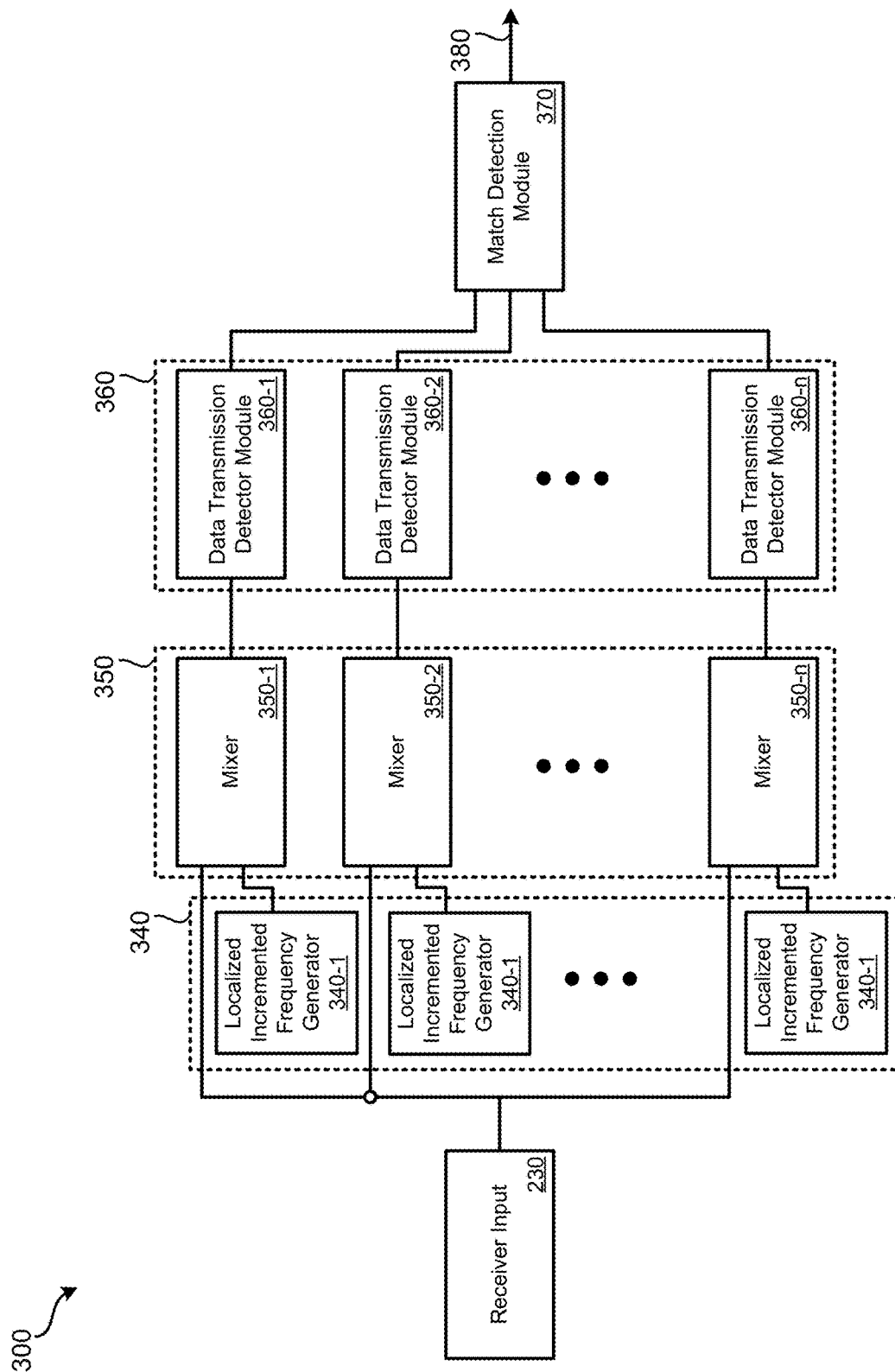
FIG. 3 illustrates an embodiment of a two-stage burst header detection system.

FIG. 3 illustrates an embodiment of a burst header detection system ("system 300"). System 300 functions in concert with system 200. Therefore, system 300 may use the output of system 200 to perform further refinement for the Doppler effect prior to other data being extracted from the wireless data transmission signal, such as a BH and payload. System 300 can include: receiver input 230; localized incremented frequency generators 340; mixers 350; data transmission detector modules 360; and match detection module 370. Output 280 from system 200 may indicate which generated frequency from an incremented frequency generator of incremented frequency generators 240 resulted in the highest score.

Receiver input 230 may represent the same receiver input as in system 200. Therefore, the same received wireless data transmission signal that was used as an input (e.g., to an FPGA) in system 200 is reused in system 300.

Localized incremented frequency generators 340 may each output an oscillating signal at different frequencies. Localized incremented frequency generators 240 may each be an NCO. These frequencies can be more tightly distributed than the frequency distribution of the incremented frequency generators 240 of system 200. The frequencies may be set to have a fixed or variable delta from each other and may be selected to create a range around the frequency output by the incremented frequency generator of incremented frequency generators 240 that resulted in the highest score from system 200. Therefore, for example, in a five mixer (and a five localized incremented frequency generator) embodiment of system 300, if the highest score was associated with incremented frequency generator 240-2 that outputs a signal having a frequency of F+$\Delta$f, localized incremented frequency generators 340 may output frequencies such as: [(F+$\Delta$ −0.25$\Delta$ f] by a first localized incremented frequency generator, [(F+$\Delta$ −0.50$\Delta$ f] by a second localized incremented frequency generator, (F+$\Delta$ f) by a third localized incremented frequency generator, [(F+$\Delta$ f)+ 0.25$\Delta$ f] by a fourth localized incremented frequency generator, and [(F+$\Delta$ f)+0.50$\Delta$ f] by a fifth localized incremented frequency generator. (In some embodiments, mixing using (F+$\Delta$ f) may not be necessary since this was performed as part of system 200.) In some embodiments, $\Delta$f may be between 50 Hz and 300 Hz. $\Delta$f may be selected based on the maximum velocity that system 200 can be expected to move away or toward the transmitter. In some embodiments, a variable $\Delta$f may be used. In some embodiments, the output frequencies of localized incremented frequency generators 340 may be within a range above and below the frequency at which the transmitter transmitted the wireless data transmission signal, at frequencies above which the transmitter transmitted the wireless data transmission signal, or at frequencies below which the transmitter transmitted the wireless data transmission signal.

The output of each mixer may be the result of mixing the wireless data transmission signal with the oscillating output of the corresponding frequency generator of localized incremented frequency generators 340. For example, if localized incremented frequency generator 340-1 outputs an oscillating signal of frequency [(F+$\Delta$ f)−0.25$\Delta$ f], the output of mixer 350-1 is the result of mixing the wireless data transmission signal with the oscillating signal [(F+$\Delta$ f)−0.25$\Delta$ f].

A data transmission detector module is present and in communication with each mixer output of system 300. Therefore, a same number of data transmission detector modules 360 are present as mixers 350. Data transmission detector modules 360 may each analyze the mixed output from a corresponding mixer to determine how well the mixed wireless data transmission signal matches expected data. While system 200 analyzed a sequence of data that serves as a reference point (e.g., UW), data transmission detector modules 360 may analyze a different string of data from the mixed wireless data transmission signals. This data may be a burst header (BH) and may indicate a type of encoding, symbol rate, and error correction used for a payload of the data transmission signal mapped to the UW and BH. Based upon whether or how well the analyzed data from each mixed wireless data transmission signal matches up with an expected BH format, a score may be output by each data transmission detector module of data transmission detector modules 360. Each score may be output to match detection module 370. Specifically, for the BH, a Fast Hadamard Transform-based Reed-Muller decoder may be used. This decoder can generate an output for each possible code word. The code word with the highest output (e.g., as a numerical value) can be selected as the detected BH.

The scores based on detection of a BH by data transmission detector modules 360 may be output to match detection module 370. Match detection module 370 may select a mixed wireless data transmission signal based on it corresponding to a greatest score. A selection of the mixed wireless data transmission signal created by system 300 may be output as signal 380. The selected mixed wireless data transmission signal based on the highest score may then be further processed, such as by decoding and using a payload, postamble, pilot bits, etc. from the selected mixed wireless data transmission signal.

The above examples of systems 200 and 300 allow for mixing and scoring to be performed in parallel. While such an arrangement can represent an optimization for processing speed, in other embodiments, optimization can be performed to decrease the amount of system resources used. For instance, if the system is implemented on an FPGA, a finite amount of processing resources are available to be programmed.

In some embodiments, a single frequency generator, mixer, and data transmission detector module may be implemented, such as incremented frequency generator 240-1, mixer 250-1, and data transmission detector module 260-1. In such an arrangement, the UW may be broken up into multiple segments (m) and the frequencies to be searched for the best match may be divided up into multiple bins (n). Sequentially, each segment m is evaluated by the data transmission detector module and assigned a separate score for the segment m corresponding to a frequency bin n. Therefore, the scores can be represented by the set: $\{S_0, S_1, S_2, \ldots S_{m-1}\}$. Each segment can be assigned a constant phase value: $\{\varphi_0, \varphi_1, \varphi_2, \ldots \varphi_{m-1}\}$ that is computed based on the frequency bin n and the center location of each segment m. According to Equation 1, the initial segmented correlation scores can be phase rotated and summed together to create a final UW correlation score:

$$UW_{corr} = \Sigma_{i=0}^{m-1} S_i * e^{j\varphi_i} \qquad \text{Eq. 1}$$

The largest correlation score among the frequency bins may then be selected by match detection module 270.

Figure 4:
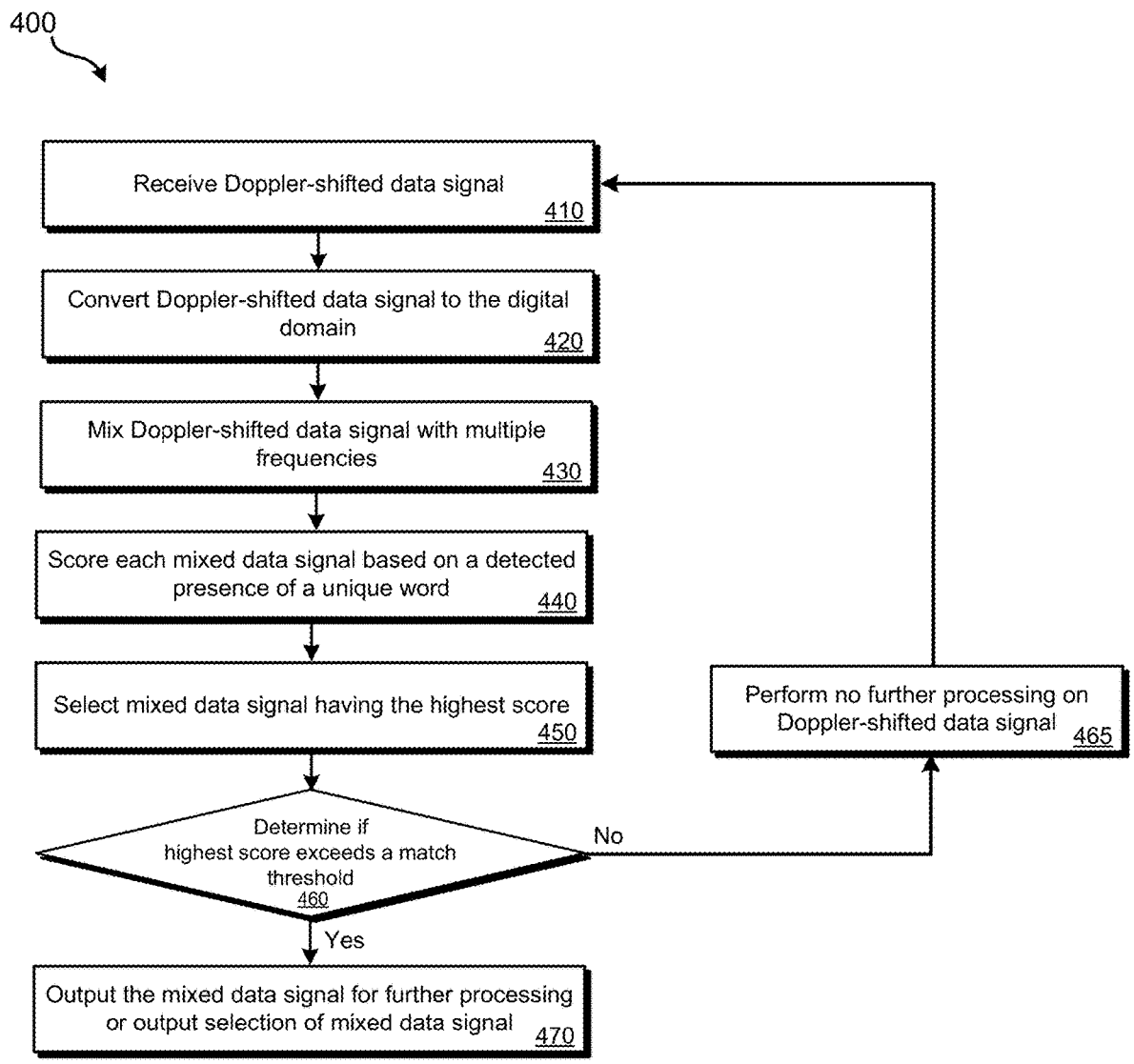
FIG. 4 illustrates an embodiment of a method for data transmission detection.

Various methods may be performed using the systems detailed in relation to FIGS. 1-3. FIG. 4 illustrates an embodiment of a method for data transmission detection. Method 400 may be implemented using a system such as systems 100, 200, and/or 300. At block 410, a Doppler shifted data signal may be received. This data signal may have been a wireless signal sent by a transmitter. The transmitter may have been attached to a vehicle or other moving device, or the receiver device performing method 400 may be moving, thus resulting in the Doppler shift. At block 420, the Doppler shifted data signal may be converted to the digital domain for analysis.

At block 430, the Doppler shifted data signal may be mixed with multiple oscillating signals having different frequencies. Block 430 may be performed serially or in parallel. The frequencies selected for mixing at block 430 may be in a range that extends above and below the frequency at which transmission of the wireless signal was known or expected to have been performed. For example, if a satellite transmitted a signal at frequency F, the frequency range may extend from F−$\Delta$f to F+$\Delta$f.

At block 440, each mixed data signal from block 430 may be scored based on detection of a particular data sequence with the mixed data signal. This particular data sequence may be a complete or partial unique word. The greater the score output at block 440, the greater the correlation between the expected unique word and the detected unique word within a particular mixed data signal.

At block 450, the mixed data signal having the highest score may be selected. At block 460 it may be determined whether this highest score exceeds a minimum match threshold value. If it does, method 400 may proceed to block 470. If not, method 400 may return to block 410 with no further processing being performed on the Doppler shifted data signal at block 465. In some embodiments, the threshold comparison may occur prior to block 450. That is, mixed data signals having a score that does not exceed a minimum threshold may be excluded from consideration at block 460.

At block 470, the selected mixed data signal that has the highest score may be output for further processing in a single stage embodiment. In a two stage embodiment, the output of method 400 may be an indication of the mixed frequency that resulted in the highest score on which a refinement process will be performed prior to further analysis of data present within the received data signal.

Figure 5:
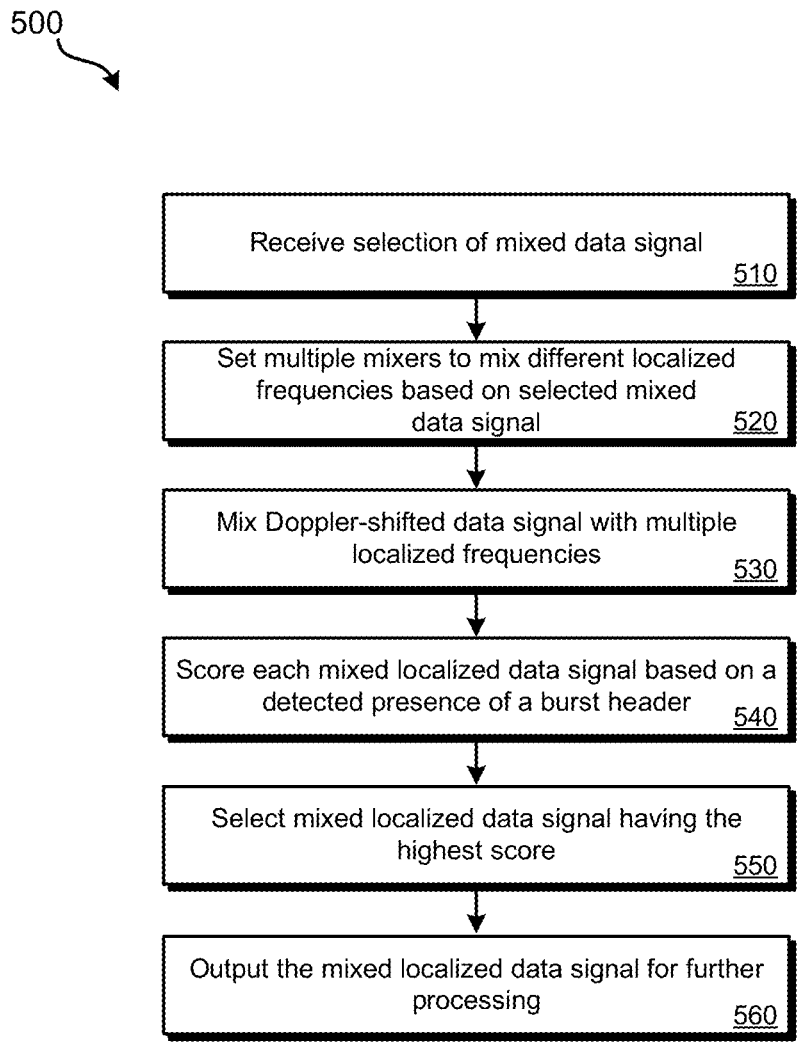
FIG. 5 illustrates another embodiment of a method for data transmission detection.

FIG. 5 illustrates another embodiment of a method for data transmission detection. Method 500 may be implemented using a system such as systems 100, 200, and/or 300. At block 510, an indication of the frequency which resulted in the highest score may be received, such as from block 470 of method 400.

At block 520, frequencies selected for mixing may be in a range that extends above and below the mixing frequency corresponding to the mixed data signal having the highest score indicated at block 470. The frequencies may be distributed in a tighter range around the mixing frequency than the spacing of the frequencies used in method 400.

At block 530, the Doppler shifted data signal may be mixed with the multiple oscillating signals having different frequencies of block 520.

At block 540, each mixed data signal from block 530 may be scored based on detection of a particular data sequence with the mixed data signal. This particular data sequence may be a complete or partial BH. The greater the score output at block 540, the greater the correlation between the expected BH (or a BH that matches a predefined format) and the detected BH within a particular mixed data signal.

At block 550, the mixed data signal having the highest score at block 540 may be selected and output for further processing at block 560. As part of block 560, the mixed data signal having the highest score in method 500 may be used to extract a payload, pilot bits, postamble UW, and/or other data present in the data stream. Method 400 and, possibly, method 500 may be repeated for each UW/BH that is to be detected.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A data transmission detection system, comprising:
a first stage of the data transmission detection system, comprising:
a receiver input through which a wireless data transmission signal is received;
a first plurality of mixers in communication with the receiver input, wherein:

each mixer of the first plurality of mixers mixes a different frequency of a plurality of frequencies with the wireless data transmission signal; and each mixer of the first plurality of mixers outputs a mixed wireless data transmission signal, thereby creating a plurality of mixed wireless data transmission signals;

a match detection module configured to:

select a mixed wireless data transmission signal of the plurality of mixed wireless data transmission signals; and a second stage of the data transmission detection system, comprising:

a second plurality of mixers that each receive the wireless data transmission signal, wherein:

each mixer of the second plurality of mixers mixes a different localized frequency of a plurality of localized frequencies with the wireless data transmission signal;

the plurality of localized frequencies is based on the selected mixed wireless data transmission signal; and each mixer of the second plurality of mixers outputs a mixed localized wireless data transmission signal, thereby creating a plurality of mixed localized wireless data transmission signals.

2. The data transmission detection system of claim 1, wherein the wireless data transmission signal comprises a unique word.

3. The data transmission detection system of claim 2, wherein the match detection module selects the mixed wireless data transmission signal based on an amount of correlation between the unique word in the mixed wireless data transmission signal and a stored unique word.

4. The data transmission detection system of claim 3, wherein the receiver input is attached to a moving object.

5. The data transmission detection system of claim 4, wherein the wireless data transmission signal received via the receiver input is Doppler shifted due to movement of the moving object relative to a transmitter that transmitted the wireless data transmission signal.

6. The data transmission detection system of claim 5, further comprising the transmitter, wherein the transmitter is part of a satellite.

7. The data transmission detection system of claim 1, wherein the first plurality of mixers, the second plurality of mixers, and the match detection module are implemented digitally.

8. The data transmission detection system of claim 1, wherein the plurality of frequencies are distributed around a transmission frequency of a transmitter that transmitted the wireless data transmission signal.

9. The data transmission detection system of claim 1, wherein a localized frequency delta between each localized frequency of the plurality of localized frequencies is smaller than a frequency delta between each frequency of the plurality of frequencies.

10. The data transmission detection system of claim 1, wherein the second stage of the data transmission detection system further comprises:

a second match detection module configured to:

select a mixed localized wireless data transmission signal from the plurality of mixed localized wireless data transmission signals for output.

11. The data transmission detection system of claim 10, wherein the second stage of the data transmission detection system is further configured to output the selected mixed localized wireless data transmission signal.

12. A method for performing data transmission detection, the method comprising:

receiving a wireless data signal;

converting, using an analog to digital converter, the wireless data signal to a digital signal;

as part of a first stage:

mixing the digital signal with digital representations of a plurality of different frequencies separately to create a plurality of mixed digital signals;

selecting a mixed digital signal of the plurality of mixed digital signals;

as part of a second stage:

mixing the digital signal with digital representations of a plurality of localized frequencies separately to create a plurality of mixed localized digital signals, wherein the plurality of localized frequencies is based on the selected mixed wireless data transmission signal; and;

selecting a mixed localized digital signal of the plurality of mixed localized digital signals; and outputting the selected mixed localized digital signal.

13. The method for performing the data transmission detection of claim 12, wherein the mixed digital signal is selected based on an amount of correlation between a unique word in the mixed digital signal and a stored unique word.

14. The method for performing the data transmission detection of claim 13, wherein the method is performed by a system that is attached to a moving object.

15. The method for performing the data transmission detection of claim 14, wherein the wireless data signal is Doppler-shifted due to movement of the moving object relative to a transmitter that transmitted the wireless data signal.

16. The method for performing the data transmission detection of claim 15, wherein the transmitter is a satellite.

17. The method for performing the data transmission detection of claim 12, wherein:

a localized frequency delta between each localized frequency of the plurality of localized frequencies is smaller than a frequency delta between each frequency of the plurality of different frequencies.

18. A non-transitory processor-readable medium, comprising processor-readable instructions configured to cause one or more processors to:

as part of a first stage:

mix a received signal with digital representations of a plurality of different frequencies separately to create a plurality of mixed digital signals;

select a mixed digital signal of the plurality of mixed digital signals;

as part of a second stage:

mix the received signal with digital representations of a plurality of localized frequencies separately to create a plurality of mixed localized digital signals, wherein:

the plurality of localized frequencies is based on the selected mixed wireless data transmission signal; and a localized frequency delta between each localized frequency of the plurality of localized frequencies is smaller than a frequency delta between each frequency of the plurality of different frequencies;

select a mixed localized digital signal of the plurality of mixed localized digital signals; and output the selected mixed localized digital signal.

19. The non-transitory processor-readable medium of claim 18, wherein the received signal comprises a unique word.

20. The non-transitory processor-readable medium of claim 19, wherein the mixed digital signal is selected based on an amount of correlation between the unique word in the mixed digital signal and a stored unique word.

\* \* \* \* \*